United States Patent
Li et al.

(10) Patent No.: US 12,210,943 B2
(45) Date of Patent: Jan. 28, 2025

(54) TRAINING A POLICY MODEL FOR A ROBOTIC TASK, USING REINFORCEMENT LEARNING AND UTILIZING DATA THAT IS BASED ON EPISODES, OF THE ROBOTIC TASK, GUIDED BY AN ENGINEERED POLICY

(71) Applicant: GOOGLE LLC, Mountain View, CA (US)

(72) Inventors: Adrian Li, San Francisco, CA (US); Benjamin Holson, Sunnyvale, CA (US); Alexander Herzog, San Jose, CA (US); Mrinal Kalakrishnan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1037 days.

(21) Appl. No.: 17/161,845

(22) Filed: Jan. 29, 2021

(65) Prior Publication Data

US 2022/0245503 A1 Aug. 4, 2022

(51) Int. Cl.
*G06N 20/00* (2019.01)
*G06N 3/008* (2023.01)
*G06N 5/04* (2023.01)

(52) U.S. Cl.
CPC ............ *G06N 20/00* (2019.01); *G06N 3/008* (2013.01); *G06N 5/04* (2013.01)

(58) Field of Classification Search
CPC ........... G06N 20/00; G06N 3/008; G06N 5/04
USPC .......................................................... 706/12
See application file for complete search history.

(56) References Cited

U.S. PATENT DOCUMENTS 11,853,401 B1 * 12/2023 Nookula .................... G06F 8/34
2019/0385022 A1 * 12/2019 Jang ........................ B25J 9/1697
2021/0362329 A1 * 11/2021 Kolluri ..................... B25J 9/161

OTHER PUBLICATIONS

Johannink, Tobias, et al. "Residual reinforcement learning for robot control." 2019 international conference on robotics and automation (ICRA). IEEE, 2019. (Year: 2019).*
Torabi, Faraz, Garrett Warnell, and Peter Stone. "Behavioral cloning from observation." arXiv preprint arXiv:1805.01954 (2018). (Year: 2018).*
Weihs, Luca, et al. "Bridging the imitation gap by adaptive insubordination." Advances in Neural Information Processing Systems 34 (2020): 19134-19146. (Year: 2020).*

(Continued)

*Primary Examiner* — Tsu-Chang Lee
(74) *Attorney, Agent, or Firm* — Gray Ice Higdon

(57) ABSTRACT

Implementations disclosed herein relate to utilizing at least one existing manually engineered policy, for a robotic task, in training an RL policy model that can be used to at least selectively replace a portion of the engineered policy. The RL policy model can be trained for replacing a portion of a robotic task and can be trained based on data from episodes of attempting performance of the robotic task, including episodes in which the portion is performed based on the engineered policy and/or other portion(s) are performed based on the engineered policy. Once trained, the RL policy model can be used, at least selectively and in lieu of utilization of the engineered policy, to perform the portion of robotic task, while other portion(s) of the robotic task are performed utilizing the engineered policy and/or other similarly trained (but distinct) RL policy model(s).

19 Claims, 7 Drawing Sheets

(56) References Cited

OTHER PUBLICATIONS

Mahmood, A. Rupam, et al. "Setting up a reinforcement learning task with a real-world robot." 2018 IEEE/RSJ International Conference on Intelligent Robots and Systems (IROS). IEEE, 2018. (Year: 2018).*
Weihs et al.; Bridging the Imitation Gap by Adaptive Insubordination; Cornell University Library; 13 pages; dated Oct. 23, 2020.
European Patent Office; International Search Report and Written Opinion issued in Application No. PCT/US2022/013635; 19 pages; dated May 11, 2022.
Warrington et al.; Robust Asymmetric Learning in POMDPs; 11 pages; dated Dec. 31, 2020.
Yeo et al.; Accelerated Deep Reinforcement Learning with Efficient Demonstration Utilization Techniques; Baltzer Science Publishers; vol. 24, No. 4; 23 pages; dated Feb. 11, 2020.

* cited by examiner

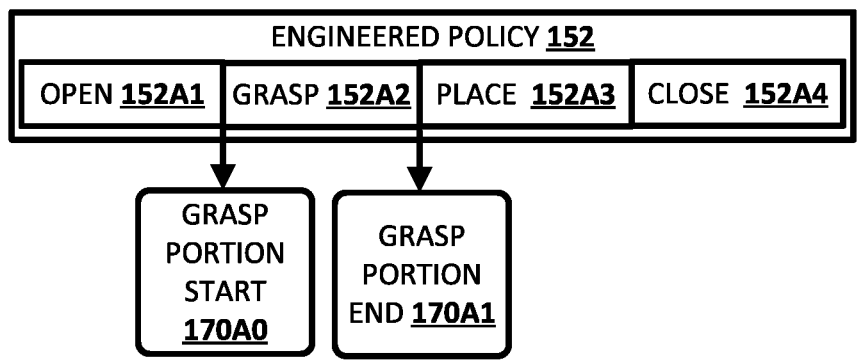
FIG. 2B1
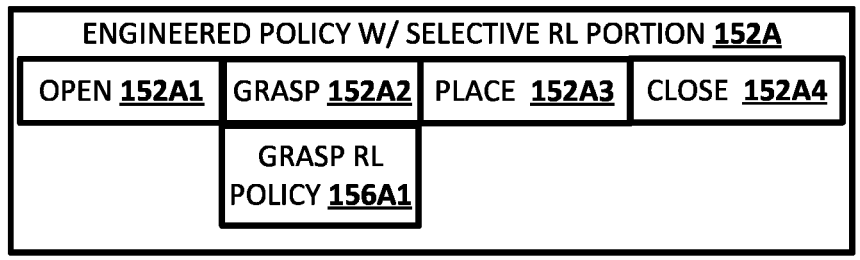
FIG. 2B2
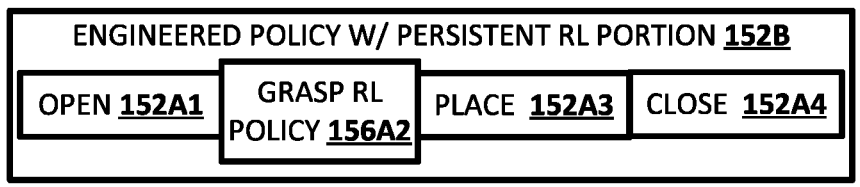
FIG. 2B3
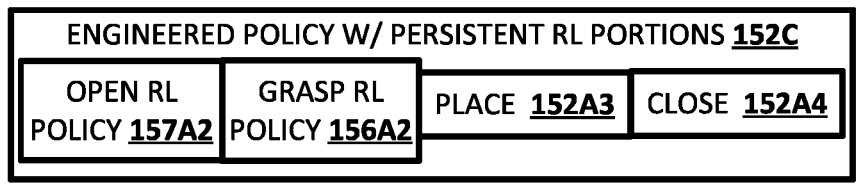
FIG. 2B4

TRAINING A POLICY MODEL FOR A ROBOTIC TASK, USING REINFORCEMENT LEARNING AND UTILIZING DATA THAT IS BASED ON EPISODES, OF THE ROBOTIC TASK, GUIDED BY AN ENGINEERED POLICY

BACKGROUND

Various reinforcement learning (RL) approaches have been proposed for robotic control. Generally, the goal in RL is to control an agent (e.g., a robot) attempting to maximize a reward function which, in the context of a robotic task, denotes a definition of what the robot should try to accomplish. More formally, at state xt in time t, the agent chooses and executes action ut according to its policy π(ut|xt), transitions to a new state xt according to dynamics of the robot p(xt|xt, ut), and receives a reward r(xt, ut) (e.g., a reward at the end of an episode of performing the task). The goal of RL is to find the optimal policy π* which maximizes the expected sum of rewards from an initial state distribution. The reward is determined based on the reward function which, as mentioned above, is dependent on the robotic task to be accomplished. Accordingly, RL in the robotics context seeks to learn an optimal policy for performance of at least a portion of a given robotic task.

In various implementations, the policy π can be approximated by a machine learning model, such as a neural network model. In some of those implementations, the machine learning model can represent a value function and can be used in processing a state, action pair in determining a value for the action (e.g., a Q-value) in view of the state. For example, at a given iteration multiple candidate actions can be processed along with a state and using the machine learning model to generate a corresponding value for each, and the action with the "best" (e.g., highest) value selected for implementations. An optimization method, such as the cross-entropy method (CEM), can optionally be used in selecting the candidate actions to process. In some other of those implementations, the machine learning model can process a state and generate a representation of a predicted action in view of the state. Accordingly, in those other implementations, the machine learning model predicts actions directly based on a processed state as opposed to representing a value function that can be used to generate a value for a state, action pair.

During the early stages of training a policy for a robotic task using reinforcement learning, the policy has been minimally trained (or not at all), resulting in the robot taking actions that are effectively random. This results in robotic episodes, that are performed using the policy during RL training, rarely resulting in successful performance of a corresponding task. As a result, a corresponding RL reward is also rarely achieved, preventing the policy from being trained to guide toward successfully performance of the task. This can be exacerbated due to the RL reward being sparse (e.g., only provided at the end of an episode of performing a robot task) and/or due to the state space and/or the action space being large and/or continuous for many instances of RL for robotic tasks.

Further, when a policy is trained, for a robotic task, independent of the environment in which the policy will be deployed, there is often a domain shift. The domain shift can result in limitations in robustness and/or accuracy of the policy when deployed, or even in failure of the policy when deployed. This domain shift can additional or alternatively be caused by the policy, when deployed, being utilized in performing a robotic task (e.g., placing) that itself is only a portion of a more comprehensive robotic task (e.g., grasping, moving, then placing), as other portion(s) of the more comprehensive robotic task can impact the environment and/or context for the robotic task.

SUMMARY

Implementations disclosed herein relate to utilizing at least one existing manually engineered policy (also referred to herein as "engineered policy"), for a robotic task, in training an RL policy model that can be used to at least selectively replace a portion of the engineered policy. Some implementations can further, optionally after training the RL policy model, train additional RL policy model(s) that can each be used to at least selectively replace a corresponding additional portion of the engineered policy.

As one non-limiting working example, the robotic task can be a comprehensive robotic task that itself includes discrete tasks/portions of: opening a door of a cabinet, grasping a target object, placing the target object in the cabinet, and closing the door of the cabinet. A manually engineered policy can exist that can be utilized to successfully perform the comprehensive robotic task with some degree of accuracy and/or robustness. However, implementations disclosed herein can utilize RL to train one or more RL policy models that can each be utilized for at least selectively replacing a corresponding portion of the robotic task. For example, an RL policy model can be trained for at least selectively replacing the "grasping a target object" portion of the robotic task.

As described herein, the RL policy model can be trained based on data from episodes of attempting performance of the comprehensive robotic task, including episodes in which the portion is performed based on the engineered policy and/or other portion(s) are performed based on the engineered policy. This can result in more efficient training of the RL policy model (i.e., achieving a given degree of robustness and/or accuracy with fewer training iterations) and/or can mitigate domain shift that would otherwise occur if the RL policy model was trained independent of the engineered policy.

As one particular example, state, action pairs that are utilized for RL training of the "grasping a target object" RL policy model can be generated based on data generated during implementation of the "grasping a target object" portion of the engineered policy. However, the states of the state, action pairs will be influenced by the preceding "opening a door of a cabinet" portion of the engineered policy, thereby mitigating domain shift. In contrast, an RL policy model trained for "grasping a target object" in isolation will result in more domain shift as a result of not encountering any such state, action pairs during RL training or, at a minimum, a lesser quantity of such state, action pairs. Additionally or alternatively, implementations disclosed herein can include, as part of the state of the state, action pairs, context information that is from outside of the "grasping a target object" portion of the episode. For example, context data that includes initial vision data (and/or other data) from a beginning of the episode and/or that includes vision data and/or determination(s) from prior portion(s) of the episode can be included as part of the state. Utilization of such context data can also mitigate domain shift. In contrast, an RL policy model trained for "grasping a target object" in isolation will not be trained having been privy to such context data.

As another particular example, a reward that is utilized with state, action pair(s) in RL training can optionally be based at least in part on whether other portion(s) of the robotic task were successful and/or whether the more comprehensive robotic task was successful (e.g., in lieu of or in addition to being based on whether the portion was successful). This can also mitigate domain shift. For example, some particular type(s) of grasps can prevent (or at least make more difficult) successful performance of the "placing the target object in the cabinet" portion of the task (and of the more comprehensive task as a result). When one or more of the utilized rewards take this into account, the RL policy model can be biased away from those particular type(s) of grasps. In contrast, had the RL policy model been trained in isolation, those particular type(s) of grasps may have been rewarded so long as they were successful grasps.

In various implementations, an RL policy model is trained, at least initially and for a portion of the engineered policy, based on data generated from episodes where the portion is performed utilizing the engineered policy (and not utilizing the RL policy model).

As a result of the data being generated from episodes where the portion is performed utilizing the engineered policy, such data reflects successful performances of the portion at a rate that is in-line with the success rate of the manually engineered policy for the portion. Accordingly, using such data enables positive rewards to be encountered at an impactful rate during at least the early stages of RL training for the RL policy model. This, in turn, can result in effective RL training for portions that could otherwise not be trained using RL, and/or can result in more efficient RL training for the robotic tasks (i.e., achieving given performance metrics with a lesser quantity of resource intensive training episodes).

In implementations where the RL policy model is trained based on data generated from episodes where the portion is performed utilizing the engineered policy, past instances of data for the portion can be identified based on them corresponding to the portion, which can be determined based on a starting point and an ending point for the portion. In some versions of those implementations, the past instances of data are already compatible with training of the RL policy model. Data is compatible with training of the RL policy model at least by virtue of it including state data that is in a state space of the RL policy model, and including action data that is in an action space of the RL policy model. For example, compatible data can include a sequence of state-action pairs of a portion, and optionally context information and/or a determined reward for the sequence or for each of the state-action pair(s). A reward can be determined in an automatic semi-supervised manner and/or based on feedback from human reviewer(s). Further, a reward can be based on whether the portion of the comprehensive robotic task was successful, whether other portion(s) of the comprehensive robotic task were successful, whether the comprehensive task as a whole was successful, and/or based on other more granular feedback (e.g., multiple reward(s) for a portion in a single episode, where the multiple rewards are based on multiple instances of human feedback during the portion).

However, in other implementations the past instances of data are not compatible with training of the RL policy model. For example, the past instances of data can include state data (e.g., environmental state data and/or robot state data) that is compatible, but can lack any action data and/or include action data that is non-compatible with training of the RL policy model. In those implementations, RL-compatible data can nonetheless be generated based on the past instances of data, and such RL-compatible data utilized in RL training of the RL policy model. For example, inferred instances of compatible action data can be generated based on the state data and/or based on non-compatible action data. For instance, two sequential instances of state data can be compared, and an instance of action data generated based on the comparison and assigned to an earlier in time instance of the state data. As a particular instance, if the instances of state data each reflect a corresponding pose of an end effector of the robot, two sequential instances can be compared to generate a vector that describes a direction of translation and/or rotation between the two poses. Also, for instance, if the non-compatible action data includes lower-level commands (e.g., individual torques commanded at actuators) and the RL action space reflects end effector displacements (e.g., direction, distance, and/or orientation), the lower-level commands can be reverse engineered to generate end effector displacements. For instance, kinematics of the robot can be utilized to map the lower-level commands into end effector task space.

In various implementations, after the RL policy model is initially trained, the RL policy model can be utilized, at least selectively, in performing the portion, and can be utilized in lieu of the engineered policy in performing the portion. In episodes where the RL policy model is utilized in performing the portion, other portion(s) can be performed in those episodes utilizing the engineered policy or utilizing other already trained RL policy model(s). The RL policy model can be further trained based on data generated from episodes where the portion is performed utilizing the RL policy model, and based on rewards from those episodes. It is noted that the data generated from performance of the portion will be compatible with training of the RL policy model as such data can reflect the states processed using the RL policy model and the sequence of actions selected for implementation utilizing the RL policy model. It is also noted that noise can also optionally be added for some episodes during performance of the portion utilizing the RL policy model, which can encourage exploration. Further, an extent of the noise can optionally be increased as RL training progresses, encouraging a greater extent of exploration as RL training progresses.

In some of the various implementations in which the RL policy model is utilized, the engineered policy can be used to perform the portion in some episodes and the RL policy model utilized in other episodes. In some versions of those implementations, a determination is made, during each episode, as to whether to utilize the engineered policy or the RL policy model in performing the portion. In some of those versions, the determination can be based on state data from at or before a starting point of the portion. For example, the RL policy model can represent a value function, and can be used in processing state, action pairs, that each include the state data and a corresponding candidate action, to generate a corresponding value for each. If all of the generated values fail to satisfy a threshold, this can indicate that utilizing the RL policy model is unlikely to result in successful performance of the portion. Accordingly, in such a situation the RL policy model can be utilized only when at least one of the values satisfies a threshold, and the engineered policy utilized otherwise. This can encourage utilization of the RL policy model in situations where the value indicates utilization of the RL policy model has some chance of success. However, the threshold need not be overly strict in many situations during training of the RL policy model, as a less strict threshold will encourage exploration. As one non-limiting example, if possible values are from 0 to 1 with 1 indicating more value, the threshold can be 0.55 and can satisfied if the value is greater than 0.55.

As another example, the state data can be utilized to predict a first action utilizing the RL policy model (e.g., the RL policy model can be utilized to directly generate values that represent the first action) and the state data can also be utilized to predict an alternate first action utilizing the engineered policy. Further, the first action and the alternate first action can be compared and a determination made, based on the comparison, whether to utilize the RL policy model of the engineered policy. For example, the RL policy model may only be utilized if the comparison indicates a threshold degree of similarity (e.g., distance-wise in action space). Accordingly, in such a situation the RL policy model can be utilized only when its initial action is not too dissimilar from the action that would otherwise be taken if the engineered policy were utilized. However, the threshold degree of similarity need not be overly strict in many situations during training of the RL policy model, as a less strict threshold will encourage exploration.

In some implementations, in response to one or more conditions being satisfied, the portion can always be performed utilizing the RL policy model, thereby completely and non-selectively replacing utilization of the engineered policy in performance of the portion. For example, the condition(s) can include a threshold amount of RL training of the RL policy model, a success rate of the RL policy model satisfying a threshold (e.g., a success rate that is higher than the engineered policy for that portion), and/or other condition(s).

Further, in some implementations, even when RL training of the RL policy model is no longer occurring, the engineered policy can be used to perform the portion in some episodes and the RL policy model utilized in other episodes. In some versions of those implementations, a determination is made, during each episode, as to whether to utilize the engineered policy or the RL policy model in performing the portion. For example, the determination can be based on one or more of the considerations mentioned above. However, when RL training is no longer occurring, the threshold(s) considered can be more strict as encouraging exploration is no longer a motivation.

As mentioned above, some implementations can at least selectively replace performance of only one portion by an engineered policy with performance utilizing an RL policy model. In some other implementations, performance of multiple portions can be at least selectively replaced with performance utilizing a corresponding one of multiple RL policy models. In some versions of those implementations, a first RL policy model for a first portion can be trained (completely or to at least a certain extent) then, only after training of the first RL policy model will a second RL policy model for a second portion be trained. This can continue until all RL policy model(s) for all desired portion(s) are trained. In some situations, this can include having multiple RL policy models that collectively perform all portions of a comprehensive task. Accordingly, in those implementations an engineered policy is gradually replaced with RL policy models, which can collectively be utilized to perform the comprehensive task more robustly and/or more accurately than the engineered policy.

An engineered policy, as described herein, excludes any policy that predicts all of its (or any of its) actions utilizing RL policy model(s). Various engineered policies are generated based on manual engineering effort, with manually specified action(s) and/or manually specified parameter(s) for selecting action(s). An engineered policy can rely on one or more machine learning models in generating goal state(s). For example, an engineered policy for grasping can rely on a machine learning model in generating a pre-grasp pose, and that pre-grasp pose can be used, according to the engineered policy, in traversing the robot to the pre-grasp pose. However, the engineered policy does not rely on any RL policy models in predicting action(s) to traverse to the pre-grasp pose. Engineered policies can additionally or alternatively be based on teleoperation input from remote human(s). For example, instead of utilizing manually scripted action(s) and/or utilizing an ML model in predicting action(s), a query can be provided to remote human(s) and teleoperation input(s), received in response to the query, can be utilized in generating the action(s). For instance, the query can include a visual representation of the environment and optionally the robot, and the teleoperation input(s) can be selecting a target point in the environment, augmented reality control of virtual robotic component(s), and/or other input(s).

As one particular example of an engineered policy, a grasping portion of an engineered policy can be used to process vision data that captures an object to be grasped and to generate a sequence of goal states for grasping the object. For instance, the goal states can include a first state that is a defined pre-grasp pose that an end effector of a robot should move to, followed by a second state that is a grasp pose that the end effector should then move to, followed by a third state that is a gripper closed state that the gripper should transition to when at the grasp pose. As another example, a manually engineered policy for a navigation task can be used to process vision data that captures an environment of the robot and generate a sequence of goal states that include a sequence of robot base poses (e.g., positions and optionally orientations) to encounter during the navigation, where the positions of the robot base poses are equally spaced and are all 5 meters apart.

As mentioned above, an engineered policy for a robotic task can optionally be one that will not generate data that is compatible with RL training of an RL policy model. Rather, as described above, at least action data for the RL training can be inferred based on the generated data. As one example, a manually engineered policy for a grasping task can be used to process vision data that captures an object to be grasped and to generate a sequence of goal states for grasping the object. For instance, the goal states can include a first state that is a defined pre-grasp pose that an end effector of a robot should move to, followed by a second state that is a grasp pose that the end effector should then move to, followed by a third state that is a gripper closed state that the gripper should transition to when at the grasp pose. Such goal states and/or the actions generated (using the engineered policy) to move between the goal states may not be directly compatible with RL for the robotic task. As one example, the action space for an RL policy model can define end effector displacements (e.g., direction, distance, and/or orientation), where the distances of the defined end effector displacements are all less than 5 cm. The pre-grasp pose is not directly represented in the action space and even the end effector displacement between the starting pose and the pre-grasp pose may not be directly represented in the action space (e.g., when the distance between the "starting pose" and pre-grasp pose is greater than 5 cm).

As another example, a manually engineered policy for a navigation task can be used to process vision data that captures an environment of the robot and generate a sequence of goal states that include a sequence of robot base poses (e.g., positions and optionally orientations) to encounter during the navigation, where the positions of the robot base poses are equally spaced and are all 5 meters apart. However, such goal states may not be directly compatible with RL training of an RL policy model. For instance, the action space for an RL policy model can include robot base displacements, where the distances of the defined robot base displacements are restricted to values between 0.5 meters and 1.5 meters. The poses of the engineered policy are not directly represented in the action space, and even the base displacements between the poses will not be directly represented in the action space, since the base displacements of the engineered policy are all 5 meters apart.

The above description is provided as an overview of only some implementations disclosed herein. These and other implementations are described in more detail herein, including in the detailed description, the claims, and the figures.

Various implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers and/or one or more robots that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2B1 illustrates a representation of an engineered policy.

FIG. 2B2 illustrates a representation of the engineered policy of FIG. 2B1, but with a selective RL policy portion.

FIG. 2B3 illustrates a representation of the engineered policy of FIG. 2B1, but with a persistent RL policy portion.

FIG. 2B4 illustrates a representation of the engineered policy of FIG. 2B1, but with two persistent RL policy portions.

FIG. 3 is a flowchart illustrating an example method of utilizing data, for a portion of a robotic task and from past episodes with the portion performed based on an engineered policy, to train a reinforcement learning policy model, according to implementations disclosed herein.

FIG. 4 is a flowchart illustrating an example method of performing an episode of attempting performance of a robotic task, according to implementations disclosed herein.

DETAILED DESCRIPTION

Figure 1:
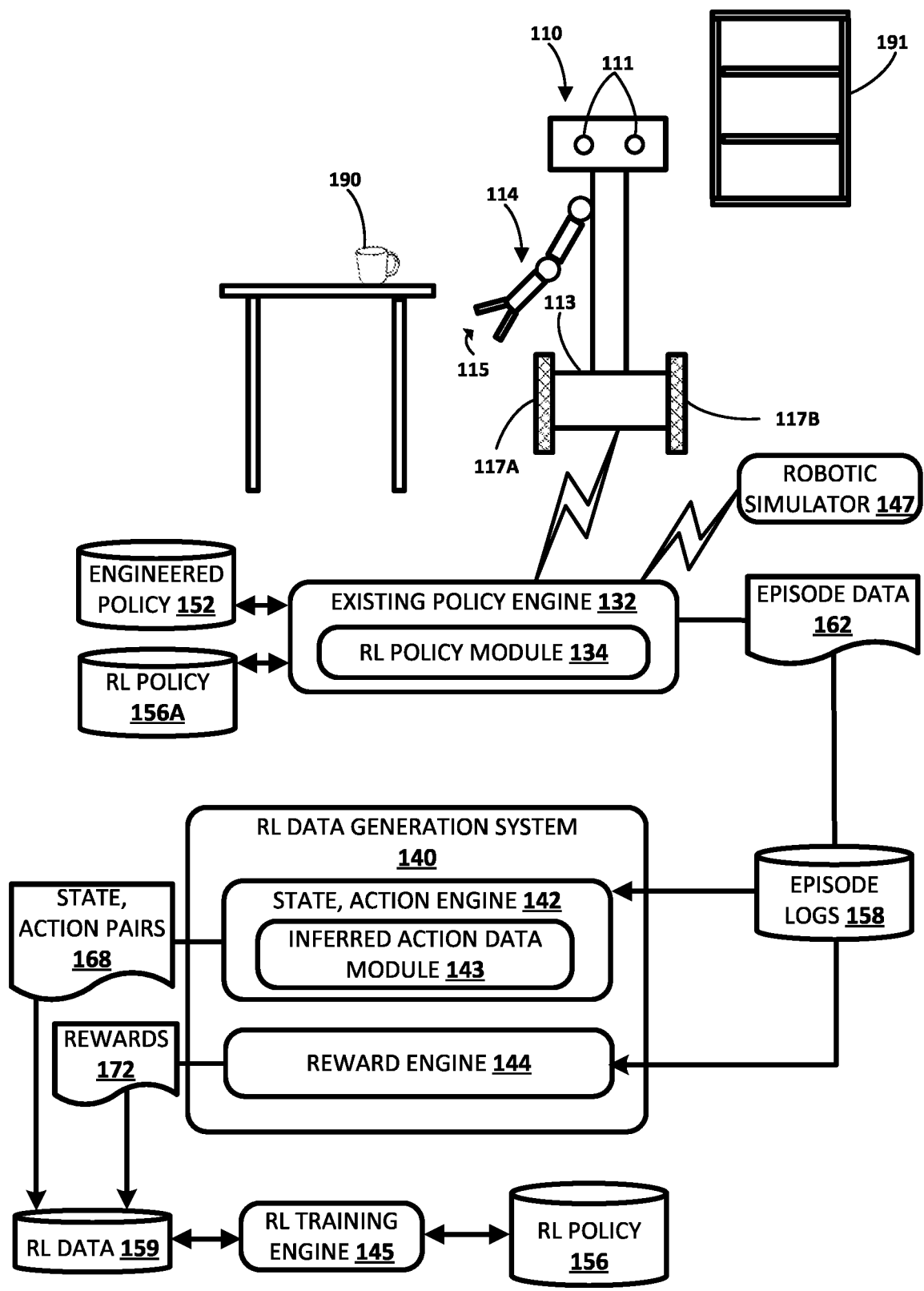
FIG. 1 illustrates an example environment in which implementations disclosed herein can be implemented.

FIG. 1 illustrates an example environment in which implementations disclosed herein can be implemented. The example environment includes a robot 110, a robotic simulator 147, an existing policy engine 132, an RL data generation system 140, and an RL training engine 145.

One or more instances of the existing policy engine 132 are utilized to perform episodes of a robotic task using robot 110, using other real world robot(s) (not illustrated), and/or using robotic simulator 147. Each of the episodes is performed using a currently (at the time of the episode) existing policy, which can include an engineered policy 152 and can optionally include (e.g., after initial training of an RL policy model) at least one RL policy model 156A. For example, some episodes can be performed using only the engineered policy 152, while other episodes can be performed using the engineered policy 152 and the RL policy 156A. Episode data 162 is generated based on the episodes performed using the existing policy engine 132 and is stored, at least temporarily, in episode logs 158. Episode logs 158 can include long-term and/or short-term memory. The episode data 162 can include action data that is based on actions implemented by robot 110 (or another real world robot or by robotic simulator 147) and/or can include state data that is based on state data (environmental and/or robotic state data) determined based on sensor component(s) of robot 110 (or another real world robot or simulated sensor component(s) of robotic simulator 147).

RL data generation system 140 can process data from the episode logs 158 to generate RL data that includes at least state, action pairs 168 and rewards 172, and optionally context information and/or other data. A state, action engine 142 of the RL data generation system 140 can generate the state, action pairs 168 based on the episode logs 158. In some implementations, the state, action engine 142 includes an inferred action data module 143 that generates RL-compatible action data utilizing data from the episode logs 158 that is not RL-compatible. A reward engine 144 of the RL data generation system 140 can generate the rewards 172 based on data from the episode logs 158. In some implementations, the reward engine 144 can generate some or all of the rewards in a semi-supervised manner using, for example, state data from the episode logs 158 and one or more automatic techniques to determine whether a robotic task, and/or portion(s) thereof, was successful. For example, if the robotic task is to pick up a particular object and move it to a new location, the reward engine 144 can process vision data, that captures the new location at the end of the episode, to determine whether the particular object is present in the new location at the end of the episode, and generate the reward based on such a determination utilizing a reward function. In some implementations, the reward engine 144 can additionally and/or alternatively generate some or all of the rewards by transmitting state data from the episode logs 158 (or modified data based on such state data), to one or more remote computing devices for manual annotation by human reviewer(s). The reward engine 144 can then generate the reward(s) based on the annotation(s) provided by the human reviewer(s) and according to a reward function.

The RL data generation system 140 stores the generated RL data, at least temporarily, in RL data database 159. RL data database 159 can include long-term and/or short-term memory. For example, the generated RL data can be stored as instances of RL data, where each instance includes a corresponding one of the state, action pairs 168, a corresponding one of the rewards 172, and optionally a corresponding instance of context information and/or other data. The RL training engine 145 utilizes the RL data, of RL data database 159, in RL training of the RL policy model 156. For example, the RL training engine 145 can utilize a Q-learning algorithm, such as a distributed Q-learning algorithm (e.g., QT-Opt) suitable for continuous action spaces. The RL policy model 156 can be, for example, a neural network model that represents a value function and that is utilized, at each of multiple iterations during a portion of an episode, to process current state data (an optionally context information) and a candidate action, and generate a value that reflects a likelihood that implementation of the candidate action will result in successful performance of the portion of the robotic task and/or of other portion(s) of the robotic task. Multiple candidate actions can be separately processed at each iteration, and a corresponding value for each generated and considered. The RL policy model can alternatively be, for example, a neural network model that is utilized, at each of multiple iterations during a portion of an episode, to process current state data (an optionally context information) and generate output that indicates an action to be implemented. For example, the output can include a vector of values that reflect an action. For instance, the value(s) can include first value(s) that reflect a translation vector for a robotic component, second value(s) that reflect a rotation vector for the robotic component, and third value(s) that reflect other state(s) for the robotic component (e.g., if the robotic component is a gripper, whether it should be open or closed).

As described herein, after at least initial training of the RL policy model 156, a version of the RL policy model 156 (e.g., version 156A) can be at least selectively utilized by the existing policy engine 132 in performing a corresponding portion of various episodes. As the RL training engine 145 further trains the RL policy model, a further updated version of the RL policy model 156 can be at least selectively utilized by the existing policy engine 132. Multiple iterations of this can occur, with progressively further trained versions of the RL policy model 156 being utilized by the existing policy engine 132 at each of the iterations.

The robot 110 is a real world robot and one or more engines of the existing policy engine 132 and/or of the RL data generation system 140 can be implemented by processor(s) of the robot and/or by one or more processor(s) that are remote from, but in communication with, the robot 110. Additionally or alternatively, one or more engines of the RL data generation system 140 (or another instance thereof) and/or of the existing policy engine 132 (or another instance thereof) can be implemented by processor(s) of the robotic simulator 147 and/or by one or more processor(s) that are remote from, but in communication with, the robotic simulator 147.

The robotic simulator 147 is implemented by one or more computer systems. The robotic simulator 147 can be used to simulate various environments that include corresponding environmental objects, to simulate a robot operating in the environment, to simulate responses of the robot in response to virtual implementation of various simulated robotic actions, and to simulate interactions between the robot and the environmental objects in response to the simulated robotic actions. Various simulators can be utilized, such as physics engines that simulate collision detection, soft and rigid body dynamics, etc. Accordingly, episodes described herein can include episodes that are performed by robot 110, that are performed by another real world robot, and/or that are performed by robotic simulator 147.

The robot 110 illustrated in FIG. 1 is a particular mobile robot. However, additional and/or alternative robots can be utilized with techniques disclosed herein, such as additional robots that vary in one or more respects from robot 110 illustrated in FIG. 1. For example, a stationary robot arm, a mobile telepresence robot, a mobile forklift robot, an unmanned aerial vehicle ("UAV"), and/or a humanoid robot can be utilized instead of or in addition to robot 110, in techniques described herein.

Robot 110 includes a base 113 with wheels 117A, 117B provided on opposed sides thereof for locomotion of the robot 110. The base 113 may include, for example, one or more motors for driving the wheels 117A, 117B of the robot 110 to achieve a desired direction, velocity, and/or acceleration of movement for the robot 110.

Robot 110 also includes a vision component 111 that can generate vision data (e.g., images, point clouds) related to shape, color, depth, and/or other features of object(s) that are in the line of sight of the vision component 111. The vision data generated by the vision component can form some or all of the environmental state data of episode data 162. Robot 110 can also include position sensor(s), torque sensor(s), and/or other sensor(s) that can generate data and such data, or data derived therefrom, can form some or all of the robot state data (if any) of episode data 162.

The vision component 111 may be, for example, a monocular camera, a stereographic camera (active or passive), and/or a light detection and ranging (LIDAR) component. A LIDAR component can generate vision data that is a 3D point cloud with each of the points of the 3D point cloud defining a position of a point of a surface in 3D space. A monocular camera may include a single sensor (e.g., a charge-coupled device (CCD)), and generate, based on physical properties sensed by the sensor, images that each includes a plurality of data points defining color values and/or grayscale values. For instance, the monocular camera may generate images that include red, blue, and/or green channels. A stereographic camera may include two or more sensors, each at a different vantage point, and can optionally include a projector (e.g., infrared projector). In some of those implementations, the stereographic camera generates, based on characteristics sensed by the two sensors (e.g., based on captured projection from the projector), images that each includes a plurality of data points defining depth values and color values and/or grayscale values. For example, the stereographic camera may generate images that include a depth channel and red, blue, and/or green channels.

Robot 110 also includes one or more processors that, for example: provide control commands to actuators and/or other operational components thereof (e.g., based on selected robot actions determined by existing policy engine 132) and/or that generate episode data 162. The control commands provided to actuator(s) and/or other operational component(s) can form part of the action data (if any) that is included in the episode data 162.

The robot 110 also includes robot arm 114 with end effector 115 that takes the form of a gripper with two opposing "fingers" or "digits." Additional and/or alternative end effectors can be utilized, or even no end effector. For example, alternative grasping end effectors can be utilized that utilize alternate finger/digit arrangements, that utilize suction cup(s) (e.g., in lieu of fingers/digits), that utilize magnet(s) (e.g., in lieu of fingers/digits), etc. Also, for example, a non-grasping end effector can be utilized such as an end effector that includes a drill, an impacting tool, etc.

Additional description of some examples of the structure and functionality of various robots is provided herein.

Turning again to existing policy engine 132, RL data generation system 140, and training engine 145, description of implementations thereof is provided with respect to a working example of robot 110 attempting performance of a robotic task that includes grasping an object (e.g., the mug 190 resting on a table in FIG. 1), moving the object toward shelving 191, and placing the object on one of the shelves of the shelving 191. It is understood that different environments of robot 110 and/or robotic simulator 147 can be utilized, such as ones where different objects to be grasped are present, different objects are present on alternative resting surfaces, different placement surfaces are present, etc. Moreover, although a specific robotic task is provided as an example, techniques disclosed herein can be utilized with additional or alternate robotic tasks. One example of such an alternate robotic task can include picking up objects and placing them in an appropriate bin, out of multiple candidate bins (e.g., a trash bin, a compostable bin, a recycling bin). Another example of an alternate robotic task can include grasping a wiping cloth, wetting the wiping cloth, and using the wetted wiping cloth in wiping down a surface. Another example of an alternate robotic task is an assembly task, such as an assembly task that includes grasping a first component and a second component, and mating the components together.

Continuing with the working example, the engineered policy 152 can enable at least sometimes successful performance of the robotic task. Further, the "grasping the object" portion can be determined as a portion of the engineered policy 152 to replace with an RL policy model. The decision to replace the "grasping the object" portion can be based on user interface input received responsive to a human interaction with input device(s) and the user interface input can specify a starting point and an ending point for that portion, or the starting and ending points automatically identified based on analysis of the engineered policy 152. Additionally or alternatively, the decision can be made automatically based on the portion having not yet been replaced with an RL policy model, and the starting point and the ending point identified based on analysis of the engineered policy 152.

In the working example, the existing policy engine 132 can perform initial episodes of the robotic task utilizing only the engineered policy 152 and without utilization of any RL policy model. Episode data 162 from those initial episodes is stored in episode logs 158 and is utilized by the RL data generation system 140 in generating initial RL data that is stored in RL data database 159. The initial RL data can include state, action pairs 168 that are in a state space and an action space for the RL policy model 156 to be trained for the portion. In some implementations, the episode data 162 lacks any action data that is in the action space for the RL policy model 156. In those implementations, the inferred action data module 143 can be utilized to infer action data that is in the action space. For example, the inferred action data module 143 can infer an action, that is in the action space, based on comparing two instances of state data from the episode data 162. As another example, the inferred action data module 143 can infer an action, that is in the action space, based on reverse engineering lower level control command(s) that are not in the action space.

The initial RL data can also include rewards 172. In some implementations, the reward engine 144 generates rewards 172 that are based on only the portion. For example, the reward for RL data for an episode can be based on only whether the portion was successful and/or efficiency (e.g., time steps required and/or distance traversed) of the portion. In some implementations, the reward engine 144 generates rewards 172 that are additionally or alternatively based on whether other portion(s) of the robotic task were successful and/or whether the robotic task, as a whole, was successful. For example, the reward for RL data for an episode can be based on whether the mug 190 was successfully placed on one of the shelves of the shelving 191. This can lead to lesser (or even no) rewards for an episode where the mug 190 is successfully grasped, yet the robotic task fails. For instance, a "top" grasp of the mug 190 can prevent (or make more difficult) placing of the mug 190 on the shelves. Considering whether the mug 190 was successfully placed on one of the shelves of the shelving 191 can therefore reward less (or not at all) many (or all) successful top grasps of the mug 190. Although not illustrated in FIG. 1, the initial RL data can also include context information as described herein.

The RL training engine 145 can utilize the initial RL data in RL database 159 to train the RL policy model 156 using RL training. After initial training, an initially trained version of the RL policy model 156A can be at least selectively utilized by the existing policy engine 132. For example, for at least some episodes the "grasping the object" portion of the episode can be performed by the RL policy module 134, utilizing the initially trained version of the RL policy model 156A and without utilization of the engineered policy 152. Further episode data 162 for such episodes can also be generated and stored in episode logs 158. It is noted that such further episode data 162 can optionally be stored in an RL-compatible format since it is generated using the initially trained version of the RL policy model 156A. Other further episode data 162 can also be generated even for the episodes that perform the portion using the engineered policy 152. The further episode data can be utilized, by the RL data generation system 140, to generate further RL data, and that further RL data utilized by the RL training engine 145 to further train the RL policy model 156. The further trained RL policy model 156 can optionally be used to replace the initially trained RL policy model 156A, and further episodes performed that at least selectively utilize the further trained RL policy model 156. This can continue until RL training of the RL policy model 156 is complete. At that point, performance of the portion can be at least selectively performed using the final RL policy model 156, or the final RL policy model can always be utilized in performance of the portion.

Figure 2A:
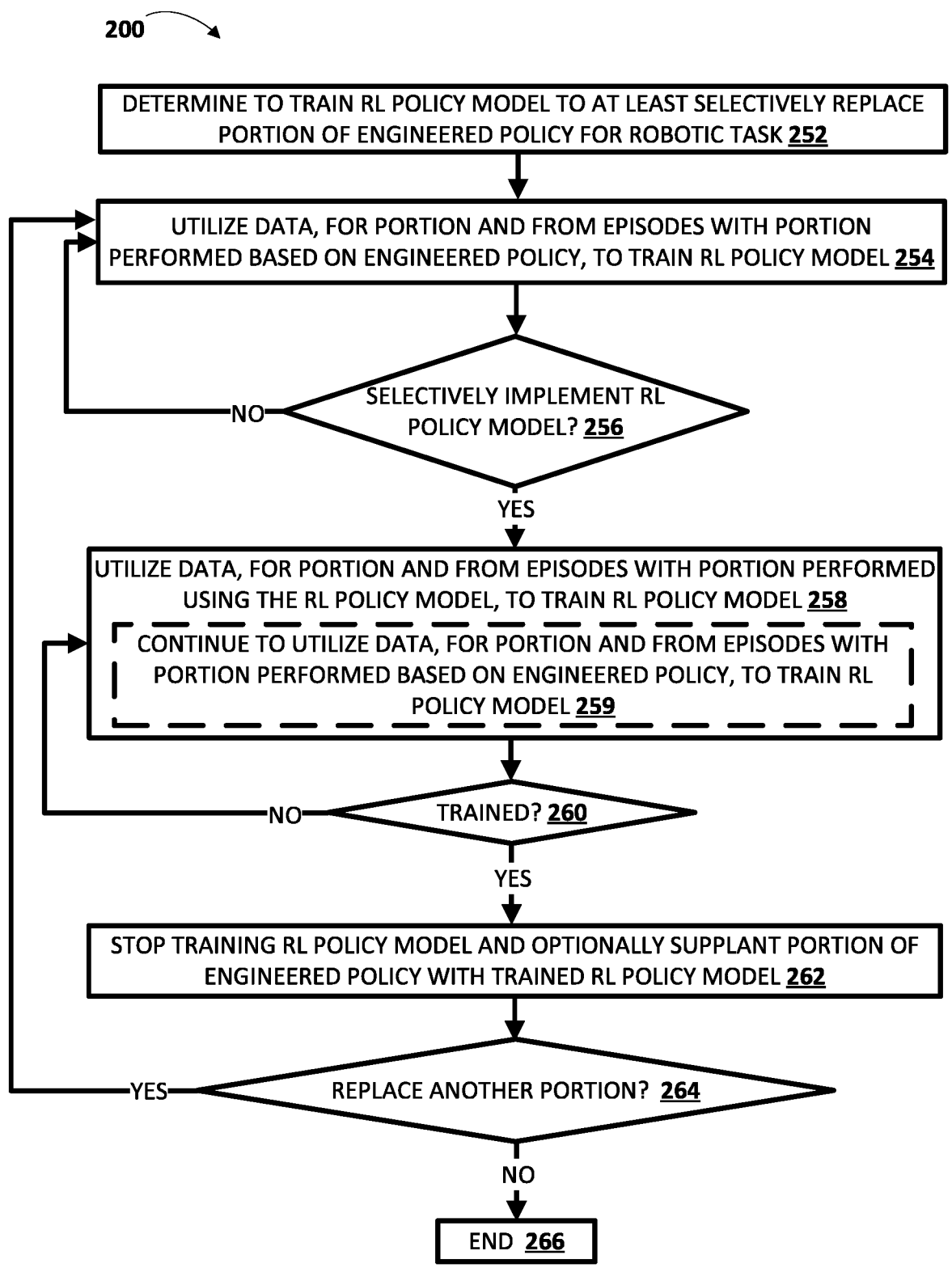
FIG. 2A is a flowchart illustrating an example method of at least selectively replacing each of one or more portions, of an engineered policy, with a corresponding reinforcement learning policy model, according to implementations disclosed herein.

Turning now to the remaining figures, additional description is provided of various components of FIG. 1. Turning initially to FIG. 2A, a flowchart illustrating an example method 200 of at least selectively replacing each of one or more portions, of an engineered policy, with a corresponding reinforcement learning policy model, according to implementations disclosed herein. For convenience, the operations of the flowchart are described with reference to a system that performs the operations. This system may include one or more processors, such as processor(s) of existing policy engine 132, RL data generation system 140, and/or training engine 145. Moreover, while operations of method 200 are shown in a particular order, this is not meant to be limiting. One or more operations may be reordered, omitted or added.

At block 252, the system determines to train an RL policy model to at least selectively replace a portion of an engineered policy for a robotic task. In some implementations of block 252, the system determines to train the RL policy model to at least selectively replace the portion based on user interface input generated based on human interaction with user interface input device(s) and the user interface input can specify a starting point and an ending point for that portion. In some implementations of block 252, the system can make the decision automatically based on the portion having not yet been replaced with an RL policy model, and the starting point and the ending point identified based on analysis, by the system, of the engineered policy.

As a working example, and with reference to FIG. 2B1, the engineered policy can be engineered policy 152 that includes, in sequence: an open portion 152A1 in which a container is opened; a grasp portion 152A2 in which an object is grasped; a place portion 152A3 in which the grasped object is placed in the open container; and a close portion 152A4 in which the container is closed. The grasp portion 152A2 can be the portion for which the RL policy model is to be trained and can include a grasp portion start 170A0 and a grasp portion end 170A2. The grasp portion starting point 170A0 and the grasp portion ending point 170A2 can be designated with reference to starting code and/or ending code in underlying software code for the engineered policy.

At block 254, the system utilizes data, for the portion and from episodes with the portion performed based on the engineered policy, to train the RL policy model. In some implementations, the system performs block 254 by performing some or all of the blocks illustrated in FIG. 3 and described below.

Continuing with the working example, RL data that is generated based on data generated during performance of the grasp portion 152A2, of the engineered policy 152, can be utilized in training the RL policy model at block 254. For example, the RL data can include state, action pairs generated based on data generated during performance of the grasp portion 152A2 and optionally reward(s) generated based on data generated during performance of the grasp portion 152A2. Optionally, the system can, at block 254, optionally train the policy model also using context information generated outside of the grasp portion 152A2 and/or based on reward(s) determined (at least in part) using data from outside of the grasp portion 152A2.

At block 256, the system determines whether to selectively implement the RL policy model. For example, at block 256, the system can determine to selectively implement the RL policy model if a threshold quantity and/or duration of RL training, from block 254, has taken place.

If, at block 256, the system determines not to selectively implement the RL policy model, the system proceeds back to block 254. If, at block 256, the system determines to selectively implement the RL policy model, the system proceeds to block 258.

At block 258, the system utilizes data, for the portion and from episodes with the portion performed using the RL policy model, to train the RL policy model. Accordingly, at block 258 the system utilizes on-policy data for the portion, in further training the RL policy model. Continuing with the working example, and with reference to FIG. 2B2, an engineered policy with a selective RL portion 152A, can be the same as the engineered policy 152 of FIG. 2B1, but can selectively implement a corresponding current version of a grasp RL policy model 156A1 in lieu of the grasp portion 152A2 of the engineered policy 152.

In some implementations, the system determines, at block 258 and during each episode, whether to utilize the RL policy model in performing the portion or to instead utilize the engineered policy model in performing the portion. In some of those implementations, the determination can be based at least in part on application of state data, to the RL policy model, as described herein. For example, in implementations where the RL policy model represents a value function, one or more values can be generated that are each based on processing the state data and a candidate action using the RL policy model. The system can determine to utilize the RL policy model in performing the portion only when one or more of the values satisfies a threshold.

In some implementations, block 258 optionally includes sub-block 259, in which the system continues to utilize data, for the portion and from episodes with the portion performed based on the engineered policy, to train the RL policy model. Put another way, the system can optionally continue to utilize data from episodes, with the portion performed based on the engineered policy, in RL training of the RL policy model. Accordingly, in those implementations on-policy and off-policy training of the RL policy model can be interleaved.

At block 260, the system determines whether RL training of the RL policy model is complete. If not, the system proceeds back to block 258. If so, the system proceeds to block 272. At block 260, the system can determine whether RL training is complete based on whether one or more conditions are satisfied. Those condition(s) can include, for example, whether a threshold duration of training has occurred, whether a threshold quantity of training has occurred, whether updating of weight(s) of the RL policy model has stabilized, a quantity or percentage of times the RL policy model is being utilized at block 258, a success rate of the portion and/or of the episode when the RL policy model is utilized, and/or other condition(s).

At block 262, the system stops training of the RL policy model, and optionally fully supplants the portion of the engineered policy with the trained RL policy model. Continuing with the working example, and with reference to FIG. 2B3, an engineered policy with a persistent RL portion 152B, can be the same as the engineered policy 152 of FIG. 2B1, but can non-selectively implement a final trained version of a grasp RL policy model 156A2 in lieu of the grasp portion 152A2 of the engineered policy 152. Accordingly, the grasp portion 152A2 can be supplanted by the final trained version of a grasp RL policy model 156A2 and the final trained version of a grasp RL policy model 156A2 persistently utilized in performing the portion.

At block 264, the system determines whether to replace another portion, of the engineered policy, with another RL policy model. If so, the system proceeds back to block 254 and performs iterations of blocks 254, 256, 258, and 260 utilizing an additional portion of the robotic task and an additional RL policy model. It is noted that in such additional iterations the final trained version of the grasp RL policy model 156A2 can always be utilized in episodes in lieu of the grasp portion 152A2 of the engineered policy 152. When, at block 260, training of the additional policy model is determined to be complete, the system can proceed to block 262, perform an iteration of block 262 for the additional RL policy model, and again proceed to block 264.

If, at an iteration of block 264, the system determines not to replace another portion, the system proceeds to block 266 and method 200 ends. When method 200 ends, the robotic task can thereafter be performed, using one or more real world robots (that can differ from any utilized in RL training), at least selectively utilizing the RL policy model(s) trained using method 200.

Figure 4:
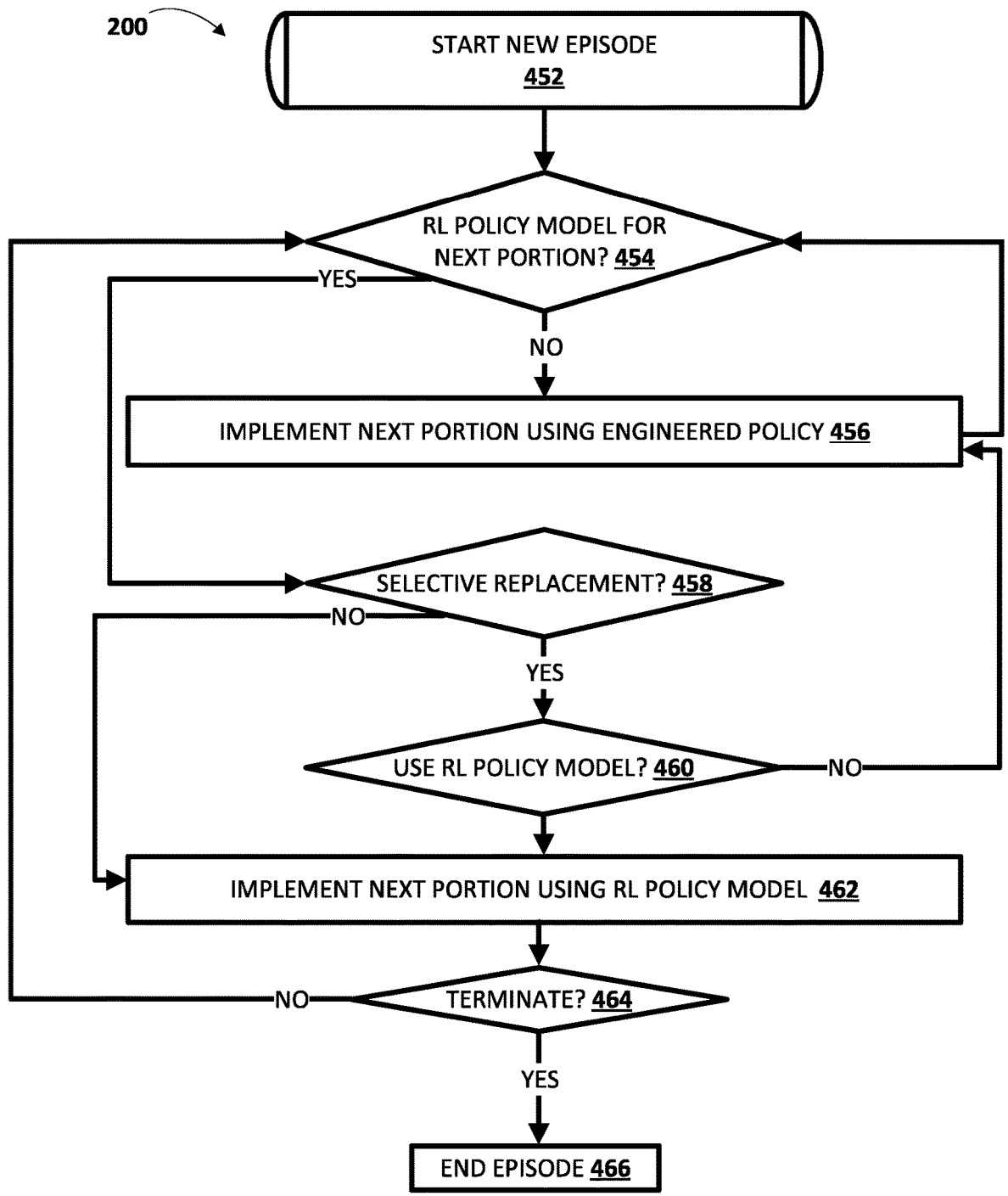

Continuing with the working example, and with reference to FIG. 2B4, an engineered policy with two persistent RL portions 152C, can be the same as the engineered policy 152 of FIG. 2B1, but can non-selectively implement a final trained version of a grasp RL policy model 156A2 in lieu of the grasp portion 152A2 of the engineered policy 152 and can also non-selectively implement a final trained version of an open RL policy model 157A2 in lieu of the open portion 152A1 of the engineered policy 152. The open RL policy model 157A2 can be trained through additional iterations of blocks 254, 256, 258, and 260, and optionally only after the final trained version of the open RL policy model 157A2 is generated. Although FIG. 2B4 illustrates only two policy models replacing only two engineered portions, it is noted that three or even all four of the engineered portions can be replaced through multiple iterations of method 200.

Figure 3:
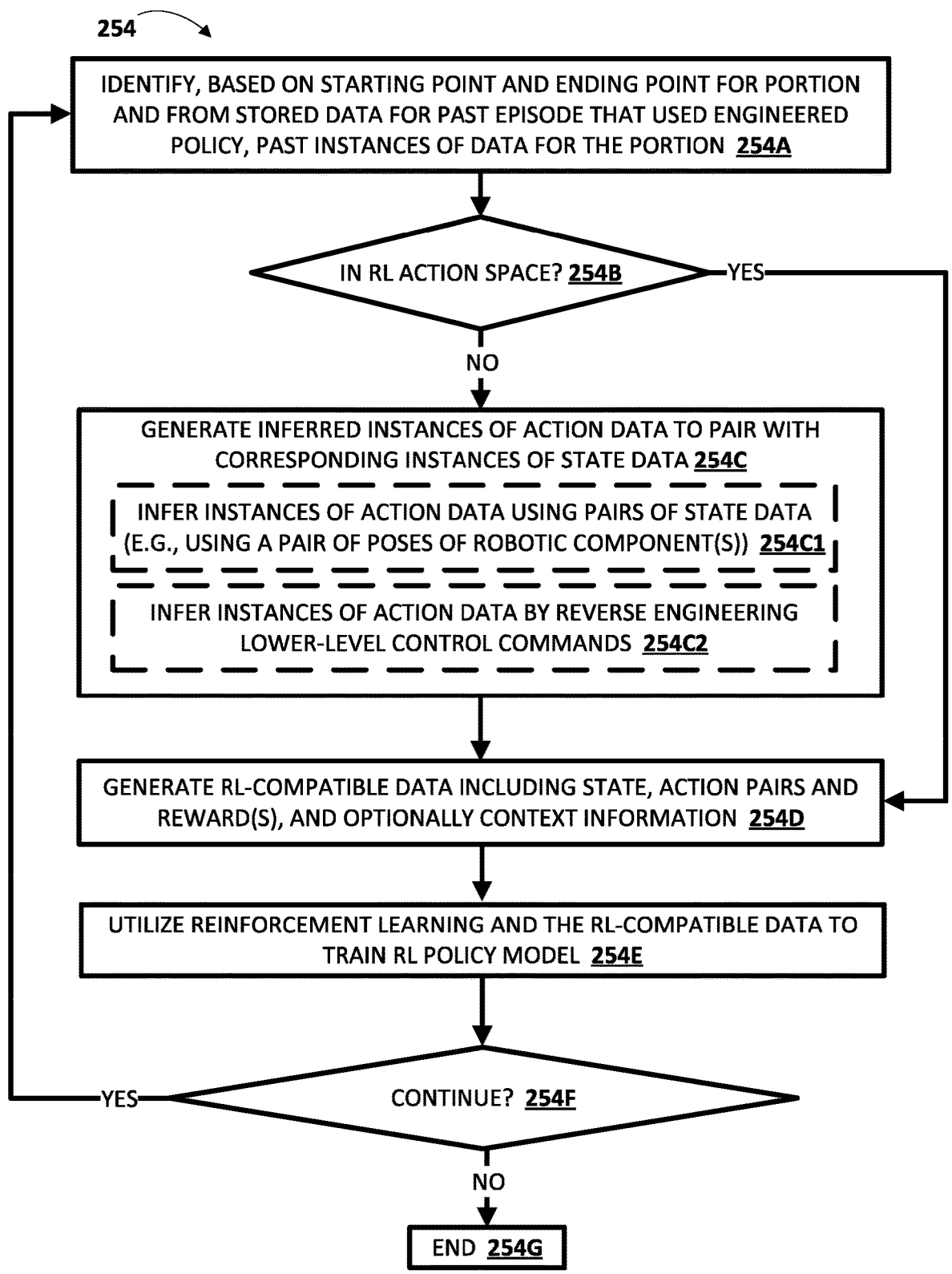

Turning now to FIG. 3 an example method of block 254 (FIG. 2A) is illustrated in more detail. For convenience, the operations of FIG. 3 are described with reference to a system that performs the operations. This system may include one or more processors, such as processor(s) of RL data generation system 140, and/or training engine 145. Moreover, while operations of FIG. 3 are shown in a particular order, this is not meant to be limiting. One or more operations may be reordered, omitted or added.

At block 254A, the system identifies, based on a starting point and an ending point for the portion and from stored data for a past episode that used the engineered policy, past instances of data for the portion.

At block 254B, the system determines whether the stored data includes action data that is in RL action space. If so, the system proceeds to block 254D (described below). If not, the system proceeds to block 254C.

At block 254C, the system generates inferred instances of action data to pair with corresponding instances of state data. Block 254C can optionally include sub-block 254C1 and/or sub-block 254C2.

At sub-block 254C1, the system infers instances of action data using pairs of state data that are included in the stored data. For example, the system can infer an instance of action data using a pair of poses of robotic component(s), as reflected in robotic state data of the state data. For instance, if the instances of state data each reflect a corresponding pose of an end effector of the robot, the system can compare two sequential instances of state data to generate a vector that describes a direction of translation and/or rotation between the two poses, and the vector utilized as an inferred instance of action data.

At sub-block 254C2, the system infers instances of action data by reverse engineering lower-level control commands that are included in the stored data. For example, if the lower-level commands are individual torques commanded at actuators, and the RL action space reflects end effector displacements, the system can reverse engineer the lower-level commands to generate end effector displacements. For instance, the system can use kinematics of the robot to map the lower-level commands into end effector task space.

At block 254D, the system generates RL-compatible data including state, action pairs and reward(s), and optionally context information. The state, action pairs are based on data from the portion as described herein.

The system can generate the reward(s) based on the data from the portion and/or based on data from additional and/or alternative portion(s). The system can generate the reward using, for example, a reward function that is based on the portion and/or other portion(s) of the robotic task. For example, the system can determine the reward as a function of one or more observations from the state data, of the stored data, at the termination of portion and/or at the termination of the episode. Also, for example, the system can determine the reward based on additional and/or alternative factors, such as a quantity of actions implemented during the portion (or other portion(s)), a distance (e.g., in Cartesian space) traversed by component(s) of the robot during the portion (or other portion(s)), and/or other factor(s).

The system can generate the context information based on stored data from portion(s) of the robotic task that preceded the portion and/or based on stored data from a beginning of the episode. For example, the context information can include state data (e.g., vision data or other state data and/or robots state data) from a start of the episode and/or from prior portion(s) of the episode. As another example, the context information can additionally or alternatively include information from prior portion(s) such as a pose and/or classification of an object to be grasped, as determined in a prior portion.

At block 254E, the system utilizes reinforcement learning and the RL-compatible data to train the RL policy model.

At block 254F, the system determines whether to continue training the RL policy model.

If, at block 254F, the system determines to continue training the RL policy model, the system proceeds back to block 254A, and identifies past instances of data, for the portion, from an additional past episode.

If, at block 254F, the system determines not to continue training the RL policy model, the system proceeds to block 254G, where block 254 ends. It is noted that block(s) of FIG. 3 can also be utilized in implementing sub-block 259 of FIG. 2A. It is also noted that different episodes in FIG. 3 and/or elsewhere herein can be performed with different robots (real or simulated), can be performed in different environments, can include different environmental object(s) and/or with environmental object(s) in different poses, and/or can start with the robot in a different initial configuration.

FIG. 4 is a flowchart illustrating an example method 400 of performing an episode of attempting performance of a robotic task, according to implementations disclosed herein. For convenience, the operations of method 400 are described with reference to a system that performs the operations. This system may include one or more processors, such as processor(s) of existing policy engine 132, which can be processor(s) of robot 110 or of robotic simulator 147. Moreover, while operations of method 400 are shown in a particular order, this is not meant to be limiting. One or more operations may be reordered, omitted or added.

Method 400 can be an example of performing an episode on a real robot after training of the RL policy model is complete (e.g., after method 200 of FIG. 2 ends). Method 400 can also be an example of performing an episode at block 258 of FIG. 2, before training of the RL policy model is complete, and based on which the RL policy model can be further trained (based on data from the portion performed using the RL policy model).

At block 452, the system starts a new episode of performing a robotic task.

At block 454, the system determines whether there is an RL policy model for the next portion of the robotic task. At an initial iteration of block 254, the next portion will be the initial portion. If, at an iteration of block 254, the system determines there is not an RL policy model for the next portion, the system proceeds to block 456, implements the next portion using an engineered policy, then returns to block 454.

If, at an iteration of block 454, the system determines there is an RL policy model for the next portion, the system proceeds to block 458.

At block 458, the system determines whether the RL policy model is one designated for selective replacement or, instead, is one designated as fully supplanting the engineered policy for the portion. If, at an iteration of block 454, the system determines the RL policy model is designated for selective replacement, the system proceeds to block 460 and determines whether to use the RL policy model or, alternatively, to utilize the engineered policy. The determination of block 460 can be based on processing of current state data as described herein. If, at an iteration of block 460 it is determined to utilize the engineered policy, the system proceeds to block 456 and implements the next portion using the engineered policy. If, at an iteration of block 460 it is determined to utilize the RL policy model, the system proceeds to block 462 and implements the next portion using the RL policy model.

Block 462 can also be encountered if, at an iteration of block 454, the system determines the RL policy model is designated as fully supplanting the engineered policy for the portion. In such a situation, the system proceeds to block 462 and implements the next portion using the RL policy model 462. After block 462, the system determines, at block 464, whether the portion that was implemented is a terminal portion of the robotic task. If so, the system proceeds to block 466 and the episode ends. If not, the system proceeds back to block 454 and determines whether there is an RL policy model for the next portion.

Figure 5:
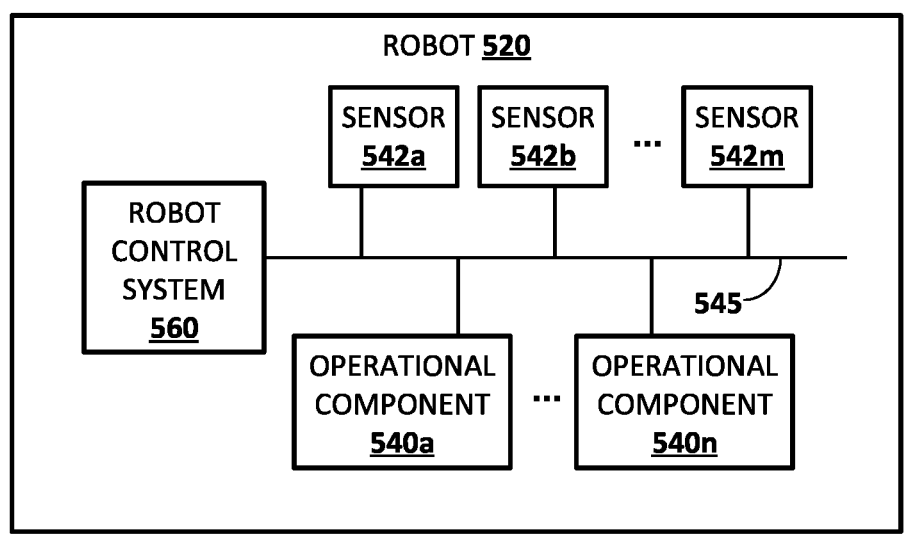
FIG. 5 schematically depicts an example architecture of a robot.

FIG. 5 schematically depicts an example architecture of a robot 520. The robot 520 includes a robot control system 560, one or more operational components 540*a*-540*n*, and one or more sensors 542*a*-542*m*. The sensors 542*a*-542*m* may include, for example, vision sensors, light sensors, pressure sensors, pressure wave sensors (e.g., microphones), proximity sensors, accelerometers, gyroscopes, thermometers, barometers, and so forth. While sensors 542*a*-*m* are depicted as being integral with robot 520, this is not meant to be limiting. In some implementations, sensors 542*a*-*m* may be located external to robot 520, e.g., as standalone units.

Operational components 540*a*-540*n* may include, for example, one or more end effectors and/or one or more servo motors or other actuators to effectuate movement of one or more components of the robot. For example, the robot 520 may have multiple degrees of freedom and each of the actuators may control actuation of the robot 520 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 560 may be implemented in one or more processors, such as a CPU, GPU, and/or other controller(s) of the robot 520. In some implementations, the robot 520 may comprise a "brain box" that may include all or aspects of the control system 560. For example, the brain box may provide real time bursts of data to the operational components 540*a*-*n*, with each of the real time bursts comprising a set of one or more control commands that dictate, inter alia, the parameters of motion (if any) for each of one or more of the operational components 540*a*-*n*. In some implementations, the robot control system 560 can be used to implement actions described herein, whether they be actions selected based on an engineered policy according to techniques disclosed herein, or actions selected using an RL policy model that is trained based at least in part on RL compatible data generated according to techniques disclosed herein.

Although control system 560 is illustrated in FIG. 5 as an integral part of the robot 520, in some implementations, all or aspects of the control system 560 may be implemented in a component that is separate from, but in communication with, robot 520. For example, all or aspects of control system 560 may be implemented on one or more computing devices that are in wired and/or wireless communication with the robot 520, such as computing device 610.

Figure 6:
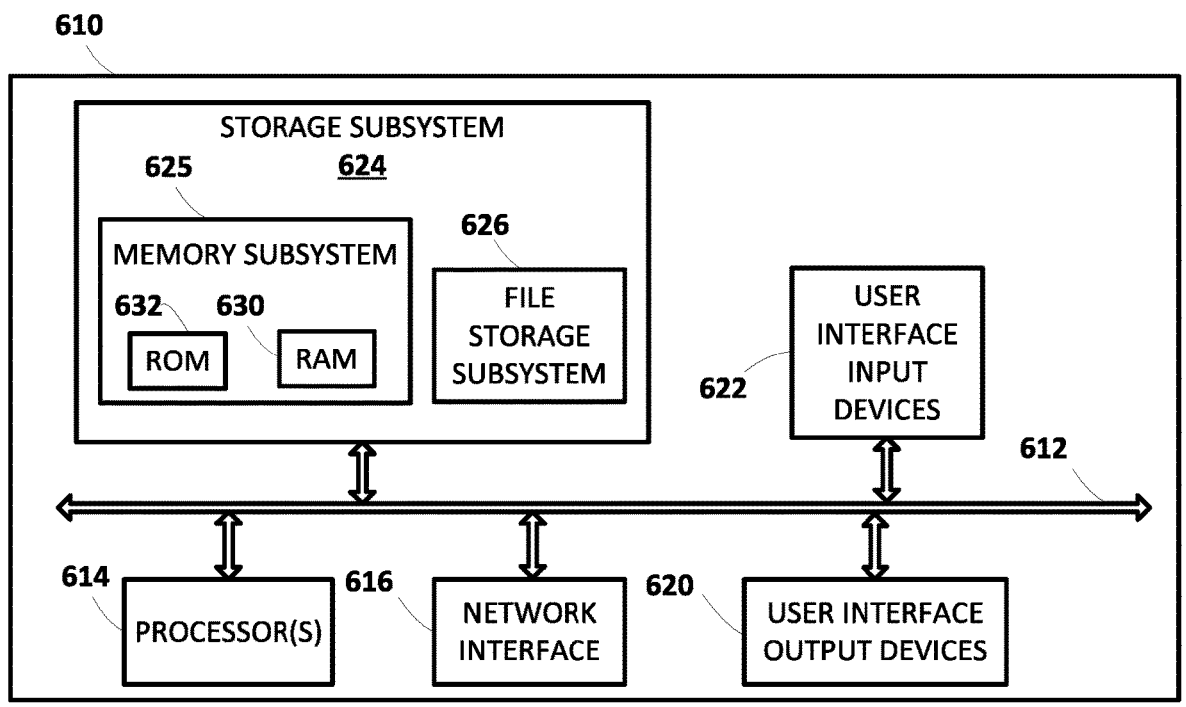
FIG. 6 schematically depicts an example architecture of a computer system.

FIG. 6 is a block diagram of an example computing device 610 that may optionally be utilized to perform one or more aspects of techniques described herein. As one non-limiting example, the robotic simulator 147 of FIG. 1 can be implemented on a computing device that includes one or more component(s) of example computing device 610. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 2A, the method of FIG. 3, and/or the method of FIG. 4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem

626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In some implementations, a method implemented by one or more processors is provided and includes determining to train a reinforcement learning policy model to at least selectively replace a portion of an engineered policy for a robotic task. The method further includes identifying a starting point and an ending point for the portion of the engineered policy. The method further includes identifying, based on the starting point and the ending point and from stored data for a past episode of attempting performance of the robotic task using the engineered policy: past instances of data for the portion. The past instances of data include instances of state data. The method further includes utilizing the past instances of data for the portion in training, using reinforcement learning, of the reinforcement learning policy model. The method further includes, subsequent to training the reinforcement learning policy model based on the past instances of data and based on additional past instances of data from additional episodes of attempting performance of the robotic task using the engineered policy: controlling a robot in a subsequent episode of attempting performance of the robotic task. Controlling the robot includes using the reinforcement learning policy model, in lieu of the engineered policy, in controlling the robot to perform the portion of the robotic task.

These and other implementations of the technology disclosed herein can include one or more of the following features.

In some implementations, the past instances of data lack any action data that is an action space of the reinforcement learning policy model. In those implementations, utilizing the past instances of data for the portion in training, using reinforcement learning, of the reinforcement learning policy model includes: generating inferred instances of action data, that are in the action space, based on the past instances of data; generating state, action pairs; and training the reinforcement learning policy using the state, action pairs and a corresponding reward for each of the state, action pairs. The state of each of the state, action pairs is based on a corresponding one of the instances of state data and the action of each of the state, action pairs is based on a corresponding one of the inferred instances of action data. In some versions of those implementations, generating the inferred instances of action data, that are in the action space, based on the past instances of data, includes: identifying a state of one or more robotic components, during the episode, based on one of the instances of state data having a first timestamp; identifying an additional state of the one or more robotic components, during the episode, based on an additional of the instances of state data having a second timestamp that is subsequent to the first timestamp; and generating a given one of the instances of action data based on comparing the state and the additional state. The action of a given one of the state, action pairs is based on the given one of the instances of action data and the state of the given one of the state, action pairs is based on the one of the instances of state data. Optionally, generating the given one of the instances of action data based on comparing the state and the additional state includes generating, as the given one of the instances of action data, an action vector having a direction that is based on a difference between the state and the additional state. In some additional or alternative versions of those implementations, generating the inferred instances of action data, that are in the action space, based on the past instances of data, comprises reverse engineering lower-level control commands, included in the past instances of data, to generate the inferred instances of action data. In some versions, the corresponding reward is the same for each of the state, action pairs and the corresponding reward is based on whether the episode resulted in successful performance of the robotic task.

In some implementations, the past instances of state data further include context information for the episode, and utilizing the past instances of data for the portion in training of the reinforcement learning policy model includes utilizing the context information. In some of those implementations, the context information includes data generated in advance of the episode and/or the context information includes data generated during the episode, but prior to the starting point.

In some implementations, the method further includes, in the subsequent episode: determining, based on current state data during the subsequent episode, whether to utilize the reinforcement learning policy model or the engineered policy in controlling the robot to perform the portion of the robotic task. In those implementations, using the reinforcement learning policy model in controlling the robot to perform the portion of the robotic task is in response to determining, based on the current state data, to utilize the reinforcement learning policy model. In some versions of those implementations, determining, based on the current state data, whether to utilize the reinforcement learning policy model or the engineered policy in controlling the robot to perform the portion of the robotic task, includes: processing the current state data, using the reinforcement learning policy model, to generate one or more values for one or more candidate actions; and determining to utilize the reinforcement learning policy model only when a value, of the one or more values, satisfies a threshold.

In some implementations, controlling the robot in the subsequent episode of attempting performance of the robotic task further includes utilizing the engineered policy in performing one or more additional portions of the robotic task.

In some implementations, determining to train the reinforcement learning policy model to at least selectively replace a portion of an engineered policy for a robotic task is in response to receiving user interface input that identifies the portion of the engineered policy and that includes a request to train the reinforcement learning policy model.

In some implementations, a method implemented by one or more processors of a robot during performance of an episode of attempting performance of a robotic task by the robot is provided and includes determining, based on current state data that is generated based on one or more sensor components of the robot, whether to utilize a reinforcement learning policy model in controlling a robot to perform a portion of the robotic task or to instead utilize an engineered policy in controlling the robot to perform the portion of the robotic task. The method further includes, in response to determining to utilize the reinforcement learning policy model: controlling the robot, to perform the portion of the robotic task, based on a sequence of actions generated utilizing the reinforcement learning policy model and a sequence of state data. The method further includes, in response to determining to utilize the engineered policy model: controlling the robot, to perform the portion of the robotic task, based on an alternate sequence of actions generated utilizing the engineered policy.

These and other implementations of the technology disclosed herein can include one or more of the following features.

In some implementations, determining, based on the current state data, whether to utilize the reinforcement learning policy model or the engineered policy in controlling the robot to perform the portion of the robotic task, includes: processing the current state data, using the reinforcement learning policy model, to generate one or more values for one or more candidate actions; and determining to utilize the reinforcement learning policy model only when a value, of the one or more values, satisfies a threshold. In some of those implementations, the current state data includes current vision data generated by a vision component of the one or more sensor components of the robot.

In some implementations, the portion of the robotic task is performed utilizing the reinforcement learning policy model, and the method further includes performing an additional portion of the robotic task utilizing the engineered policy. In some of those implementations, the additional portion precedes the portion.

In some implementations, the portion of the robotic task is performed utilizing the reinforcement learning policy model, and the method further includes generating at least one reward for the episode and updating the reinforcement learning policy model based on the at least one reward and based on the sequence of actions and the sequence of state data.

In some implementations a method implemented by one or more processors is provided and includes determining to train a reinforcement learning policy model to at least selectively replace a portion of an engineered policy for a robotic task. The method further includes identifying a starting point and an ending point for the portion of the engineered policy. The method further includes identifying, based on the starting point and the ending point and from stored data for a past episode of attempting performance of the robotic task using the engineered policy: past instances of data for the portion. The past instances of data include instances of state data, and the past instances of data lack any action data that is an action space of the reinforcement learning policy model. The method further includes generating inferred instances of action data, that are in the action space, based on the past instances of data. The method further includes generating state, action pairs. The state of each of the state, action pairs is based on a corresponding one of the instances of state data and the action of each of the state, action pairs is based on a corresponding one of the inferred instances of action data. The method further includes training the reinforcement learning policy using the state, action pairs and a corresponding reward for each of the state, action pairs.

In some implementations a method implemented by one or more processors is provided and includes determining to train a reinforcement learning policy model to at least selectively replace a portion of an engineered policy for a robotic task. The method further includes identifying a starting point and an ending point for the portion of the engineered policy. The method further includes identifying, based on the starting point and the ending point and from stored data for a past episode of attempting performance of the robotic task using the engineered policy: past instances of data for the portion. The method further includes generating state, action pairs, where the state of each of the state, action pairs is based on a corresponding one of the instances data. The method further includes generating at least one reward for the state, action pairs. Generating the at least one reward is based on whether an additional portion, of the engineered policy, was successfully performed in the episode. The method further includes training the reinforcement learning policy using the state, action pairs and a corresponding reward for each of the state, action pairs.

These and other implementations of the technology disclosed herein can include one or more of the following features.

In some implementations, generating the at least one reward is further based on whether the portion was successfully performed in the episode. In some of those implementations, the portion is a non-terminal portion of the engineered policy and the additional portion is a terminal portion of the engineered policy.

What is claimed is:
1. A method implemented by one or more processors, the method comprising:
  determining to train a reinforcement learning policy model to at least selectively replace a portion of an engineered policy for a robotic task, wherein the portion of the engineered policy corresponds to a portion of the robotic task;
  identifying a starting point and an ending point for the portion of the engineered policy;
  identifying, based on the starting point and the ending point and from stored data for a past episode of attempting performance of the robotic task using the engineered policy:
    past instances of data for the portion of the engineered policy, wherein the past instances of data comprise instances of state data;
  utilizing the past instances of data for the portion of the engineered policy in training, using reinforcement learning, of the reinforcement learning policy model; and
  subsequent to training the reinforcement learning policy model based on the past instances of data and based on additional past instances of data from additional episodes of attempting performance of the robotic task using the engineered policy:
    controlling a robot in a subsequent episode of attempting performance of the robotic task, controlling the robot comprising:
      using the reinforcement learning policy model, in lieu of the portion of the engineered policy, in controlling the robot to perform the portion of the robotic task; and
      using an additional portion of the engineered policy, in lieu of the reinforcement learning policy, in controlling the robot to perform an additional portion of the robotic task.
2. The method of claim 1, wherein the past instances of data lack any action data that is an action space of the reinforcement learning policy model, and wherein utilizing the past instances of data for the portion of the engineered policy in training, using reinforcement learning, of the reinforcement learning policy model comprises:
  generating inferred instances of action data, that are in the action space, based on the past instances of data;
  generating state, action pairs, wherein the state of each of the state, action pairs is based on a corresponding one of the instances of state data and wherein the action of each of the state, action pairs is based on a corresponding one of the inferred instances of action data; and
  training the reinforcement learning policy using the state, action pairs and a corresponding reward for each of the state, action pairs.

3. The method of claim 2, wherein generating the inferred instances of action data, that are in the action space, based on the past instances of data, comprises:
  identifying a state of one or more robotic components, during the episode, based on one of the instances of state data having a first timestamp;
  identifying an additional state of the one or more robotic components, during the episode, based on an additional of the instances of state data having a second timestamp that is subsequent to the first timestamp; and
  generating a given one of the instances of action data based on comparing the state and the additional state, wherein the action of a given one of the state, action pairs is based on the given one of the instances of action data and the state of the given one of the state, action pairs is based on the one of the instances of state data.

4. The method of claim 3, wherein generating the given one of the instances of action data based on comparing the state and the additional state comprises generating, as the given one of the instances of action data, an action vector having a direction that is based on a difference between the state and the additional state.

5. The method of claim 2, wherein generating the inferred instances of action data, that are in the action space, based on the past instances of data, comprises reverse engineering lower-level control commands, included in the past instances of data, to generate the inferred instances of action data.

6. The method of claim 2,
  wherein the corresponding reward is the same for each of the state, action pairs,
  wherein the portion of the robotic task, to which the portion of the engineered policy corresponds, precedes the additional portion of the robotic task, and
  wherein the corresponding reward is based on whether the episode resulted in successful performance of the robotic task.

7. The method of claim 1, wherein the past instances of state data further comprise context information for the episode, and wherein utilizing the past instances of data for the portion of the engineered policy in training of the reinforcement learning policy model comprises utilizing the context information.

8. The method of claim 7, wherein the context information includes data generated in advance of the episode.

9. The method of claim 7, wherein the context information includes data generated during the episode, but prior to the starting point.

10. The method of claim 1, further comprising, in the subsequent episode:
  determining, based on current state data during the subsequent episode, whether to utilize the reinforcement learning policy model or the engineered policy in controlling the robot to perform the portion of the robotic task;
  wherein using the reinforcement learning policy model in controlling the robot to perform the portion of the robotic task is in response to determining, based on the current state data, to utilize the reinforcement learning policy model.

11. The method of claim 10, wherein determining, based on the current state data, whether to utilize the reinforcement learning policy model or the engineered policy in controlling the robot to perform the portion of the robotic task, comprises:
  processing the current state data, using the reinforcement learning policy model, to generate one or more values for one or more candidate actions; and
  determining to utilize the reinforcement learning policy model only when a value, of the one or more values, satisfies a threshold.

12. The method of claim 1, wherein determining to train the reinforcement learning policy model to at least selectively replace the portion of the engineered policy for the robotic task is in response to receiving user interface input that identifies the portion of the engineered policy and that includes a request to train the reinforcement learning policy model.

13. A method implemented by one or more processors of a robot during performance of an episode of attempting performance of a robotic task by the robot, the method comprising:
  determining, based on current state data that is generated based on one or more sensor components of the robot, whether to utilize a reinforcement learning policy model in lieu of an engineered policy in controlling a robot to perform a portion of the robotic task or to instead utilize an engineered policy in lieu of the reinforcement learning policy model in controlling the robot to perform the portion of the robotic task;
  in response to determining to utilize the reinforcement learning policy model:
    controlling the robot, to perform the portion of the robotic task, based on a sequence of actions generated utilizing the reinforcement learning policy model and a sequence of state data; and
  in response to determining to utilize the engineered policy model:
    controlling the robot, to perform the portion of the robotic task, based on an alternate sequence of actions generated utilizing the engineered policy.

14. The method of claim 13, wherein determining, based on the current state data, whether to utilize the reinforcement learning policy model or the engineered policy in controlling the robot to perform the portion of the robotic task, comprises:
  processing the current state data, using the reinforcement learning policy model, to generate one or more values for one or more candidate actions; and
  determining to utilize the reinforcement learning policy model only when a value, of the one or more values, satisfies a threshold.

15. The method of claim 14, wherein the current state data comprises current vision data generated by a vision component of the one or more sensor components of the robot.

16. The method of claim 13, wherein the portion of the robotic task is performed utilizing the reinforcement learning policy model, and further comprising:
  performing an additional portion of the robotic task utilizing the engineered policy.

17. The method of claim 16, wherein the additional portion of the robotic task precedes the portion of the robotic task.

18. The method of claim 13, wherein the portion of the robotic task is performed utilizing the reinforcement learning policy model, and further comprising:
   generating at least one reward for the episode; and
   updating the reinforcement learning policy model based on the at least one reward and based on the sequence of actions and the sequence of state data.

19. A method implemented by one or more processors, the method comprising:
   determining to train a reinforcement learning policy model to at least selectively replace a portion of an engineered policy for a robotic task, wherein the portion of the engineered policy corresponds to a portion of the robotic task and wherein selectively replacing the portion of the engineered policy for the robotic task causes, during performance of the robotic task, the portion of the robotic task to be performed using the reinforcement learning policy in lieu of the portion of the engineered policy, and one or more additional portions of the robotic task to be performed using the engineered policy in lieu of the reinforcement learning policy;
   identifying a starting point and an ending point for the portion of the engineered policy;
   identifying, based on the starting point and the ending point and from stored data for a past episode of attempting performance of the robotic task using the engineered policy:
      past instances of data for the portion, wherein the past instances of data comprise instances of state data, and wherein the past instances of data lack any action data that is an action space of the reinforcement learning policy model;
   generating inferred instances of action data, that are in the action space, based on the past instances of data;
   generating state, action pairs, wherein the state of each of the state, action pairs is based on a corresponding one of the instances of state data and wherein the action of each of the state, action pairs is based on a corresponding one of the inferred instances of action data; and
   training the reinforcement learning policy using the state, action pairs and a corresponding reward for each of the state, action pairs.

\* \* \* \* \*